United States Patent
Hsin et al.

(10) Patent No.: US 10,224,834 B2
(45) Date of Patent: Mar. 5, 2019

(54) POWER INVERTER AND POWER INVERTING METHOD

(71) Applicant: DELTA ELECTRONICS, INC., Taoyuan (TW)

(72) Inventors: Wei-Lun Hsin, Taoyuan (TW); Xin-Hung Lin, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 0 days.

(21) Appl. No.: 15/832,721

(22) Filed: Dec. 5, 2017

(65) Prior Publication Data
US 2018/0262124 A1   Sep. 13, 2018

(30) Foreign Application Priority Data
Mar. 13, 2017 (TW) .............................. 106108122 A

(51) Int. Cl.
| | |
|---|---|
| H02M 7/538 | (2007.01) |
| H02M 7/5387 | (2007.01) |
| H02M 7/483 | (2007.01) |
| H02M 7/487 | (2007.01) |
| H02M 1/42 | (2007.01) |

(52) U.S. Cl.
CPC ........... *H02M 7/5387* (2013.01); *H02M 1/42* (2013.01); *H02M 7/483* (2013.01); *H02M 7/487* (2013.01)

(58) Field of Classification Search
CPC ....... H02M 7/487; H02M 7/5387; H02M 1/42
See application file for complete search history.

(56) References Cited

U.S. PATENT DOCUMENTS

| | | | |
|---|---|---|---|
| 2012/0218785 A1* | 8/2012 | Li | H02M 1/34 363/21.12 |
| 2013/0258737 A1 | 10/2013 | Schoenlinner et al. | |
| 2013/0272045 A1 | 10/2013 | Soeiro et al. | |

FOREIGN PATENT DOCUMENTS

| | | |
|---|---|---|
| CN | 102769400 B | 4/2015 |
| CN | 105164908 A | 12/2015 |
| CN | 205847123 U | 12/2016 |
| JP | 2016-174448 A | 9/2016 |
| TW | M397656 U1 | 2/2011 |
| TW | 201526515 A | 7/2015 |

OTHER PUBLICATIONS

The pertinent parts of US20130258737A1.

\* cited by examiner

*Primary Examiner* — Jue Zhang
(74) *Attorney, Agent, or Firm* — CKC & Partners Co., LLC

(57) ABSTRACT

A power inverter includes a plurality of bridge arms and a plurality of switching circuits. The bridge arms are electrically coupled to a first and a second dc node and a neutral point node, and respectively coupled to a corresponding one of a plurality of ac output nodes to provide an ac output voltage and output current via the ac output node. The switching circuits are respectively coupled between a corresponding one of the ac output nodes and the neutral point node. Each of the switching circuits includes a first transistor, a second transistor, a first diode and a second diode. The first and the second transistors are coupled in series to each other. The first and the second diodes are electrically coupled in inverse-parallel to the first and the second transistors respectively.

20 Claims, 7 Drawing Sheets

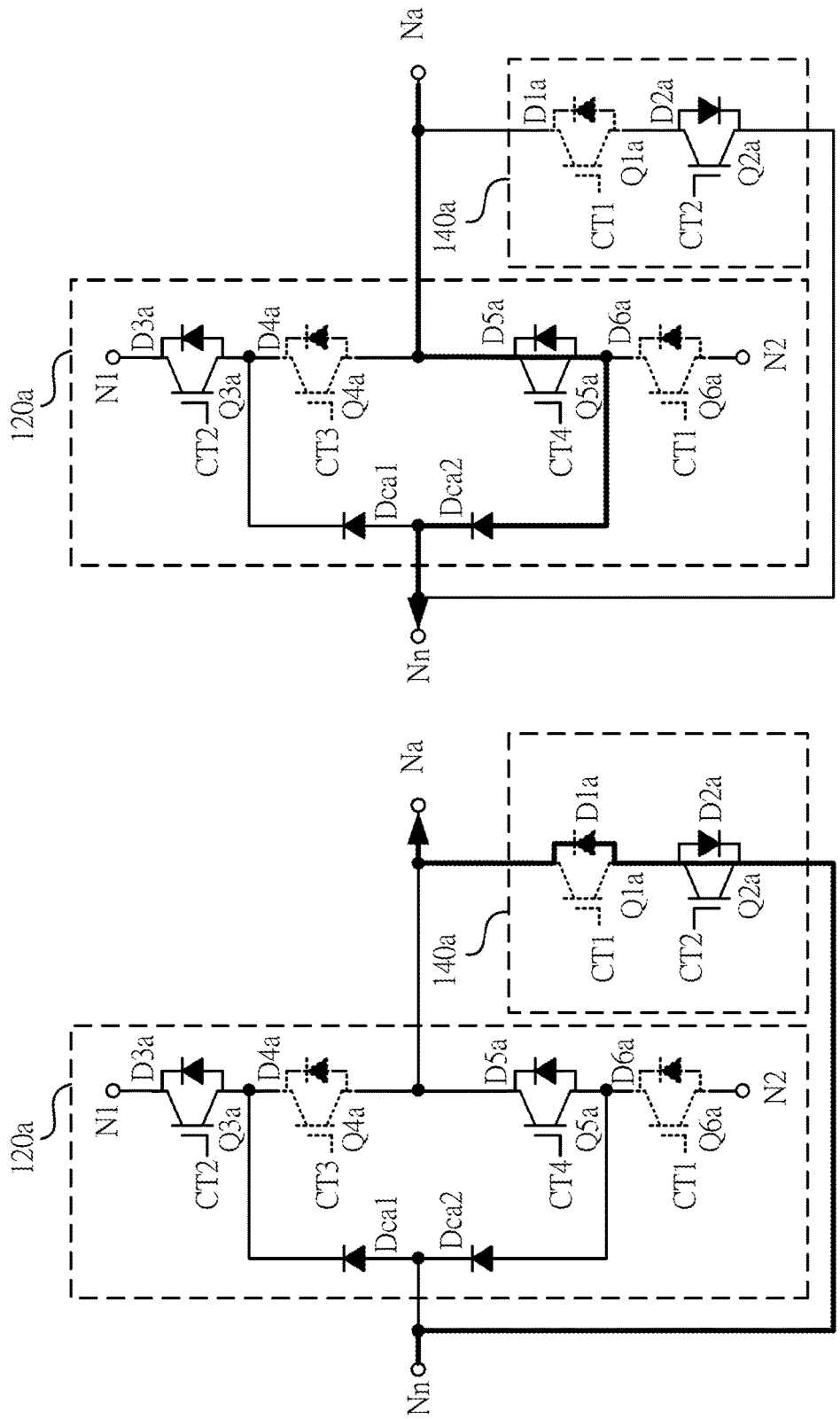

700 a plurality of ac output terminals Na~Nc in the power inverter 100 is conducted selectively to one of the first dc terminal N1, the second dc terminal N2, and the neutral point terminal Nn of the power inverter 100 by a plurality of bridge legs 120a~120c in the power inverter 100, in order to provide multiple-phase ac output voltage Va~Vc — S710 the power inverter 100 selectively turns on or off the first transistor Q1a electrically coupled to the corresponding one (e.g., the ac output terminal Na) of the ac output terminals Na~Nc according to the first control signal CT1 — S720 the power inverter 100 selectively turns on or off the second transistor Q2a electrically coupled between the first transistor Q1a and the neutral point terminal Nn according to the second control signal CT2 complementary to the first control signal CT1 — S730

FIG. 7

POWER INVERTER AND POWER INVERTING METHOD

RELATED APPLICATIONS

This application claims priority to Taiwan Application Serial Number 106108122, filed Mar. 13, 2017, which is herein incorporated by reference.

BACKGROUND

Technical Field

The present disclosure relates to a power inverter, and in particular, to a power inverter with reactive power compensating ability.

Description of Related Art

In recent times, as the development in the semiconductor technology, transistor switches are widely used in various power electronics devices. However, in the neutral point clamped inverter nowadays, in a complete cycle, the transistor switches are required to be controlled and switched in low frequency for half cycle and in high frequency for another half cycle.

Accordingly, it is difficult to choose proper transistor elements to balance the switching loss and the conduction loss, which causes the poor conversion efficiency. Therefore, an important area of research in the field involves ways in which to improve the circuit structure nowadays.

SUMMARY

One aspect of the present disclosure is a power inverter. The power inverter includes bridge legs and switching circuits. The bridge legs are electrically coupled to a first dc terminal, a neutral point terminal and a second dc terminal of the power inverter, and respectively electrically coupled to one of a plurality of ac output terminals, in order to provide an ac output voltage and an output current via the corresponding ac output terminal. The switching circuits are respectively electrically coupled between one of the ac output terminals and the neutral point terminal. Each of the switching circuits includes a first transistor, a second transistor, a first diode, and a second diode. The first transistor and the second transistor are coupled in series to each other, and the first diode and the second diode are inversely coupled in parallel to the first transistor and the second transistor respectively.

Another aspect of the present disclosure is a power inverting method. The power inverting method includes conducting, by a plurality of bridge legs in a power inverter, a plurality of ac output terminals to one of a first dc terminal, a second dc terminal, and a neutral point terminal of the power inverter selectively, in order to provide multiple-phase ac output voltage; selectively turning on or off a first transistor electrically coupled to a corresponding one of the ac output terminals according to a first control signal; and selectively turning on or off a second transistor electrically coupled between the first transistor and the neutral point terminal according to a second control signal complementary to the first control signal.

It is to be understood that both the foregoing general description and the following detailed description are by examples, and are intended to provide further explanation of the disclosure as claimed.

BRIEF DESCRIPTION OF THE DRAWINGS

The disclosure can be more fully understood by reading the following detailed description of the embodiments, with reference made to the accompanying drawings as follows:

FIG. 3A, FIG. 3B~FIG. 6A, FIG. 6B are diagrams illustrating the operation of the switches in the bridge leg and the corresponding switching circuit, and the current path according to some embodiments of the present disclosure.

FIG. 7 is a diagram illustrating a power inverting method according to some embodiments of the present disclosure.

DETAILED DESCRIPTION

Figure 1:
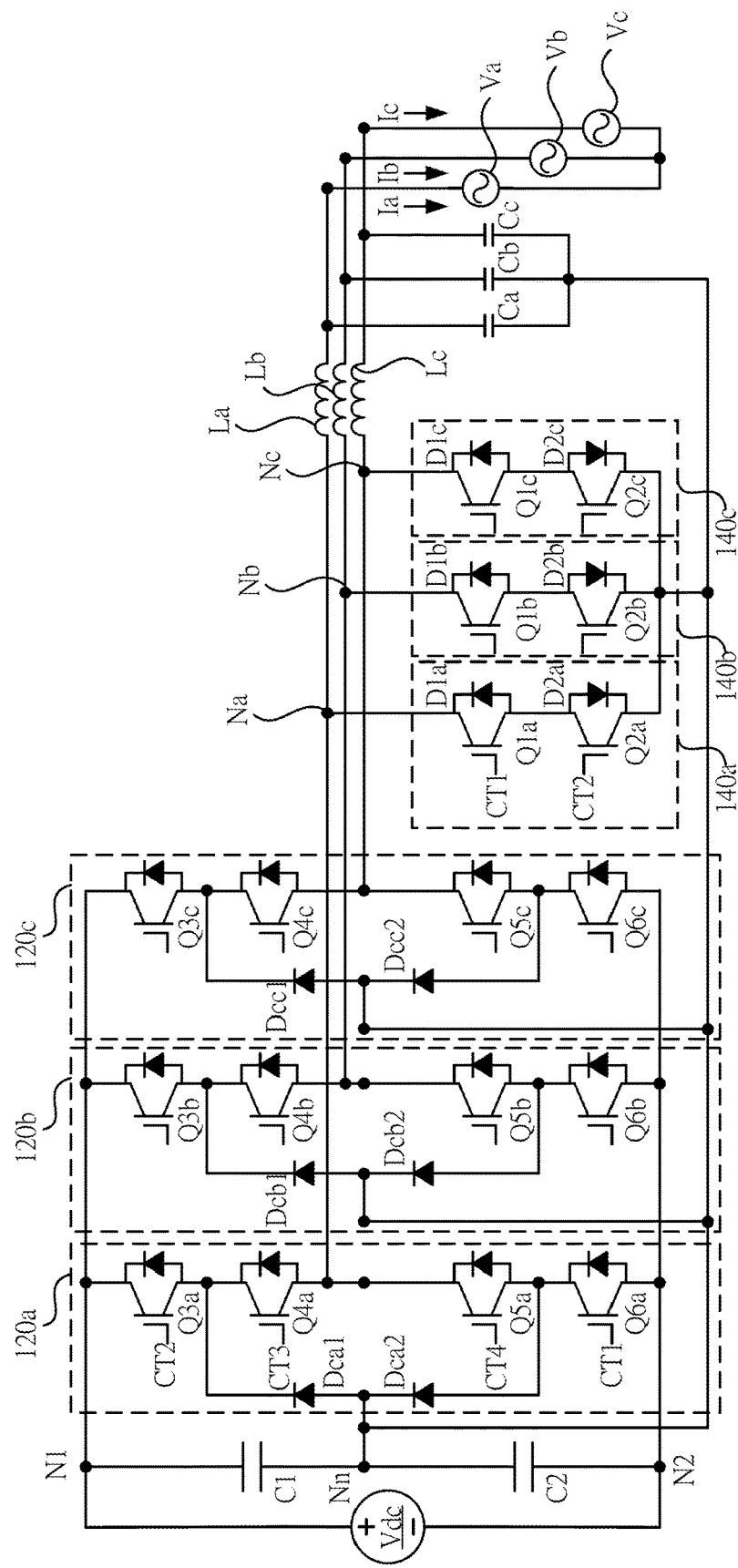
FIG. 1 is a diagram illustrating a power inverter according to some embodiments of the present disclosure.

The embodiments herein described are by examples, and are not intended to be limiting. Alternatives, modifications and equivalents may be included within the spirit and scope of the disclosure as defined by the appended claims. Drawings are not drawn to scale and not meant to limit the actual embodiments of the present disclosure. Wherever possible, same reference numbers are used in the drawings and the description to refer to the same or like parts for better understanding. While method steps are disclosed herein as a series of acts or events, some may occur in different orders and/or concurrently with other acts or events apart from those described herein. The term "coupled" and "connected" may be used to indicate that two or more elements cooperate or interact with each other, and may also be termed electrically coupled/connected. The terms "first," "second," etc., are used to distinguish one element from another.

Reference is made to FIG. 1. FIG. 1 is a diagram illustrating a power inverter 100 according to some embodiments of the present disclosure. As depicted in FIG. 1, in some embodiments, the power inverter 100 includes bridge legs 120a, 120b, 120c, switching circuits 140a, 140b, 140c corresponding to the bridge legs 120a, 120b, 120c, DC side capacitance units C1, C2, AC side capacitance units Ca, Cb, Cc, and inductance unit La, Lb, Lc.

As depicted in FIG. 1, the DC side capacitance units C1 and C2 are electrically coupled in series to each other, and electrically coupled across two terminals of DC voltage source Vdc. A first terminal of the DC side capacitance unit C1 is electrically coupled to a first DC terminal N1 of the power inverter 100. A second terminal of the DC side capacitance unit C1 and a first terminal of the DC side capacitance unit C2 are electrically coupled to each other at a neutral point terminal Nn of the power inverter 100. A second terminal of the DC side capacitance unit C2 is electrically coupled to a second DC terminal N2 of the power inverter 100.

In some embodiments, the power inverter 100 achieves the neutral point clamped (NPC) multi-level inverter structure by the bridge legs 120a, 120b, 120c, and form a three-phase output via three sets of the bridge legs 120a, 120b, 120c. The bridge legs 120a, 120b, 120c are electrically coupled to the first dc terminal N1, the neutral point terminal Nn and the second dc terminal N2, and respectively electrically coupled to a corresponding one of ac output terminals Na, Nb, Nc, in order to provide corresponding ac output voltage Va, Vb, Vc and output current Ia, Ib, Ic via the corresponding ac output terminal Na, Nb, Nc.

The switching circuits 140a, 140b, 140c are respectively electrically coupled between a corresponding one of the ac output terminals Na, Nb, Nc and the neutral point terminal Nn. Specifically, the switching circuits 140a, 140b, 140c respectively includes first transistors Q1a, Q1b, Q1c and second transistors Q2a, Q2b, Q2c coupled in series to each other, and first diodes D1a, D1b, D1c and second diodes D2a, D2b, D2c.

The first diodes D1a, D1b, D1c and second diodes D2a, D2b, D2c are inversely coupled in parallel to the first transistors Q1a, Q1b, Q1c respectively and the second transistors Q2a, Q2b, Q2c respectively. In some embodiments, based on the type of the transistors, the first diodes D1a, D1b, D1c and second diodes D2a, D2b, D2c may be the parasitic diodes of the first transistors Q1a, Q1b, Q1c and the second transistors Q2a, Q2b, Q2c respectively, or may be diode elements assembled with the first transistors Q1a, Q1b, Q1c and the second transistors Q2a, Q2b, Q2c together. In some embodiments, the anodes of first diodes D1a, D1b, D1c are respectively coupled to the anodes of the second diodes D2a, D2b, D2c. The cathodes of first diodes D1a, D1b, D1c are electrically coupled to the AC output terminals Na, Nb, Nc of each phase respectively. The cathodes of second diodes D2a, D2b, D2c are electrically coupled to each other at the neutral point terminal Nn.

Specifically, the bridge legs 120a, 120b, 120c respectively include third transistor Q3a, Q3b, Q3c, fourth transistors Q4a, Q4b, Q4c, fifth transistors Q5a, Q5b, Q5c, and sixth transistors Q6a, Q6b, Q6c, which are electrically coupled between the first dc terminal N1 and the second dc terminal N2 in series by order, and first clamping diodes Dca1, Dcb1, Dcc1, and second clamping diodes Dca2, Dcb2, Dcc2.

The neutral point terminal Nn is electrically coupled to the third transistor Q3a, Q3b, Q3c and the fourth transistor Q4a, Q4b, Q4c via the first clamping diodes Dca1, Dcb1, Dcc1, and to the fifth transistors Q5a, Q5b, Q5c and the sixth transistors Q6a, Q6b, Q6c via the second clamping diode Dca2, Dcb2, Dcc2. The AC output terminals Na, Nb, Nc are electrically coupled to the fourth transistors Q4a, Q4b, Q4c and the fifth transistors Q5a, Q5b, Q5c.

The inductance units La, Lb, Lc are respectively electrically coupled between the AC output terminals Na, Nb, Nc and the AC side capacitance units Ca, Cb, Cc. One terminal of the AC side capacitance units Ca, Cb, Cc is electrically coupled to the inductance units La, Lb, Lc, another terminal of the AC side capacitance units Ca, Cb, Cc is electrically coupled to each other at the neutral point terminal Nn to form a LC filtering circuit.

Thus, by the switching operation of the transistor switches in the bridge legs 120a, 120b, 120c and in the switching circuit 140a, 140b, 140c, the DC power supplied by the DC voltage source Vdc may be converted to three phase AC power to the AC output terminals Na, Nb, Nc, and be filtered by the filtering circuits form by the AC side capacitance units Ca, Cb, Cc and the inductance units La, Lb, Lc, in order to provide the corresponding three phase AC output voltages Va, Vb, Vc and three phase output currents Ia, Ib, Ic.

For the convenience of explanation, the switching operation of the transistor switches in the bridge legs 120a, 120b, 120c and in the switching circuit 140a, 140b, 140c will be discussed in the following paragraphs in accompanied with the related drawings. In addition, each transistor switches may be implemented by various types of transistor elements. Although the transistor switches illustrated in FIG. 1 are Insulated Gate Bipolar Transistors (IGBTs), which is merely an example and not meant to limit the present disclosure. In some embodiments, other types of transistors, for example, bipolar junction transistors (BJTs) or Metal-Oxide-Semiconductor Field-Effect Transistors (MOSFETs), may be chosen to implement the switches.

In addition, for the convenience of explanation, in the following paragraphs, the switching operation of the transistor switches in the bridge leg 120a and the corresponding switching circuit 140a will be discussed. The switching operation of the transistor switches in the bridge legs 120b, 120c and the corresponding switching circuits 140b, 140c are similar thereto and thus are omitted herein for the sake of brevity.

As depicted in FIG. 1, the first transistor Q1a in the switching circuit 140a is configured to receive a first control signal CT1 to be ON or OFF selectively. The second transistor Q2a is configured to receive a second control signal CT2 to be ON or OFF selectively. In some embodiments, the first control signal CT1 and the second control signal CT2 are complementary of each other.

Similar to the second transistor Q2a, the third transistor Q3a in the bridge leg 120a is also configured to be ON or OFF selectively according to the second control signal CT2. The fourth transistor Q4a is configured to be ON or OFF selectively according to a third control signal CT3. The fifth transistor Q5a is configured to be ON or OFF selectively according to a fourth control signal CT4. In some embodiments, the third control signal CT3 and the fourth control signal CT4 are complementary of each other.

Similar to the second transistor Q1a, the third transistor Q6a is also configured to be ON or OFF selectively according to the first control signal CT1. Alternatively stated, the on/off operation of the third transistor Q3a and the sixth transistor Q6a in the bridge leg 120a is respectively similar to the second transistor Q2a and the first transistor Q1a in the switching circuit 140a. When the first transistor Q1a is on and the second transistor Q2a is off, the sixth transistor Q6a is on and the third transistor Q3a is off. On the other hand, when the first transistor Q1a is off and the second transistor Q2a is on, the sixth transistor Q6a is off and the third transistor Q3a is on.

Figure 2:
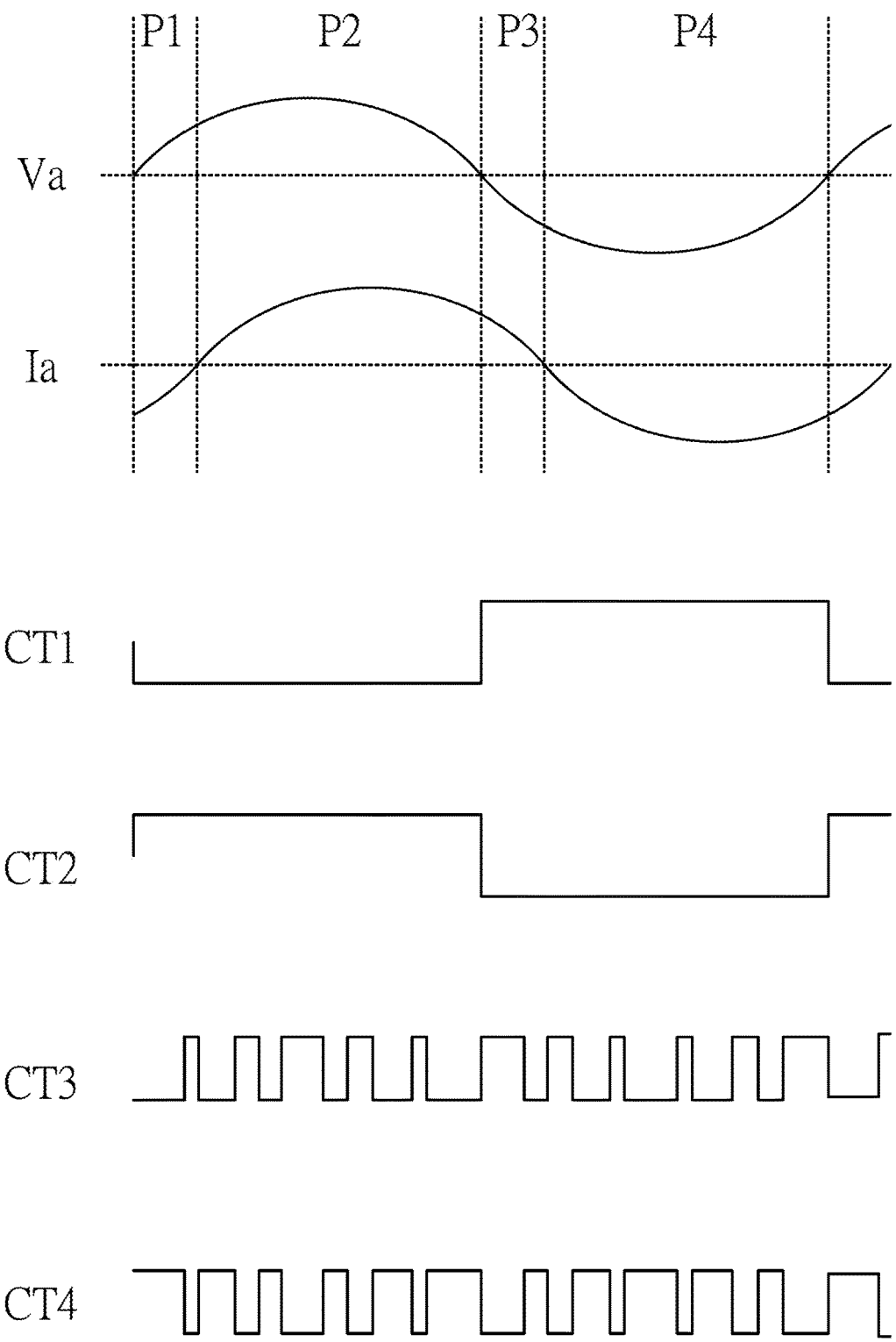
FIG. 2 is a diagram illustrating signal waveforms according to some embodiments of the present disclosure.

Reference is made to FIG. 2. FIG. 2 is a diagram illustrating signal waveforms according to some embodiments of the present disclosure. For clarity and convenience of the explanation, the signal waveforms illustrated in FIG. 2 are discussed in accompanied with the power inverter 100 in FIG. 1, but is not limited thereto.

As shown in FIG. 2, in periods P1 and P2, the corresponding first control signal CT1 is at a disable level (e.g., a low level) to turn off the first transistor Q1a and the sixth transistor Q6a. Since the first control signal CT1 and the second control signal CT2 are complementary of each other, the corresponding second control signal CT2 is at an enable level (e.g., a high level) to turn on the second transistor Q2a and the third transistor Q3a. At the time the AC output voltage Va outputted by the bridge leg 120a is positive.

On the other hand, in periods P3 and P4, the corresponding first control signal CT1 is at the enable level (e.g., a high level) to turn on the first transistor Q1a and the sixth transistor Q6a, and the corresponding second control signal CT2 is at the disable level (e.g., a low level) to turn off the second transistor Q2a and the third transistor Q3a. At the time the AC output voltage Va outputted by the bridge leg 120a is negative.

Thus, in a complete output cycle, by outputting the compensated third control signal CT3 and the fourth control signal CT4, the inductance units La may store or release energy selectively in order to output the AC output voltage Va as depicted in FIG. 2. As shown in figure, since the third control signal CT3 and the fourth control signal CT4 switches with high frequency respectively in the upper half cycle in which the AC output voltage Va is positive, and in the lower half cycle in which the AC output voltage Va is negative, the switching frequency of the third control signal CT3 and the fourth control signal CT4 is higher than the switching frequency of the first control signal CT1 and the second control signal CT2.

In addition, as shown in FIG. 2, when the power inverter 100 provides or absorbs reactive power to the loads, a phase difference is presented between the AC output voltage Va and the output current Ia, such that the voltage and the current may be in the same direction or in the opposite direction in a complete cycle.

For example, in the upper half cycle in which the AC output voltage Va is positive, during the period P1 the output current Ia is negative, which is in the opposite direction of the AC output voltage Va. During the period P2, the output current Ia is positive, which is in the same direction of the AC output voltage Va. Similarly, in the lower half cycle in which the AC output voltage Va is negative, during the period P3 the output current Ia is positive, which is in the opposite direction of the AC output voltage Va. During the period P4, the output current Ia is negative, which is in the same direction of the AC output voltage Va.

Accordingly, no matter in the upper half cycle in which the AC output voltage Va is positive or in the lower half cycle in which the AC output voltage Va is negative, the bridge leg 120a and the corresponding switching circuit 140a are configured to provide bi-directional current path between the DC side and the AC side, such that the power inverter may perform reactive power compensation to provide or absorb extra reactive power.

In the following paragraphs, the operating states of each transistor switch and the current path will be discussed in accompanied with FIG. 3A, FIG. 3B~FIG. 6A, FIG. 6B. Reference is made to FIG. 3A, FIG. 3B~FIG. 6A, FIG. 6B. FIG. 3A, FIG. 3B~FIG. 6A, FIG. 6B are diagrams illustrating the operation of the switches in the bridge leg 120a and the corresponding switching circuit 140a, and the current path according to some embodiments of the present disclosure. In FIG. 3A, FIG. 3B~FIG. 6A, FIG. 6B, the solid lines indicate the transistor switches operated in the ON state, and the dotted lines indicate the transistor switches operated in the OFF state.

Figures 3A, 3B:
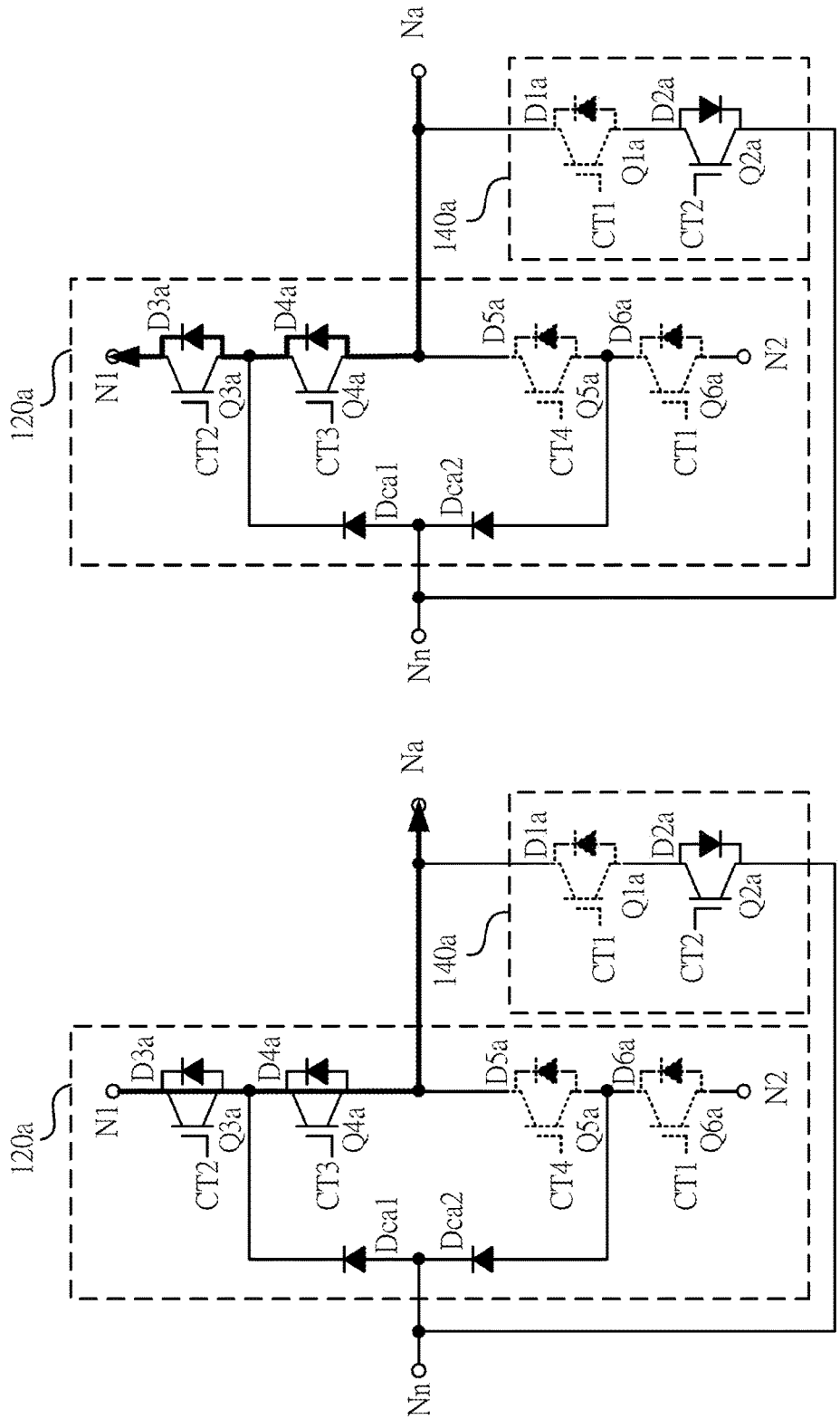

First, as shown in FIG. 3A and FIG. 3B, in the upper half cycle in which the AC output voltage Va is positive, the second transistor Q2a and the third transistor Q3a are ON, the first transistor Q1a and the sixth transistor Q6a are OFF. When the bridge leg 120a stores energy in the inductance unit La, the third control signal CT3 is at the enable level (e.g., a high level) to turn on the fourth transistor Q4a. The compensated fourth control signal CT4 is at the disable level (e.g., a low level) to turn off the fifth transistor Q5a, such that a path is formed between the AC output terminal Na and the first DC terminal N1.

As depicted in FIG. 3A, when the voltage and the current are in the same direction, the turned-on third transistor Q3a and the fourth transistor Q4a form the current path such that the current may flow from the first DC terminal N1 to the AC output terminal Na. On the other hand, as depicted in FIG. 3B, when the voltage and the current are in the opposite direction, the third diode D3a inversely coupled in parallel to the third transistor Q3a, and the fourth diode D4a inversely coupled in parallel to the fourth transistor Q4a form the current path, such that the current may flow from the AC output terminal Na to the first DC terminal N1 via the forward third diode D3a and the fourth diode D4a.

Next, as depicted in FIG. 4A and FIG. 4B, when the inductance unit La releases energy, the third control signal CT3 is at the disable level to turn off the fourth transistor Q4a, and the compensated fourth control signal CT4 is at the enable level to turn on the fifth transistor Q5a, such that a path is formed between the AC output terminal Na and the neutral point terminal Nn.

As depicted in FIG. 4A, when the voltage and the current are in the same direction, the turned-on second transistor Q2a and the first diode D1a inversely coupled in parallel to the first transistor Q1a form a current path, such that the current may flow from the neutral point terminal Nn to the AC output terminal Na via the forward first diode D1a. On the other hand, as shown in FIG. 4B, when the voltage and the current are in the opposite direction, the turned-on transistor Q5a and the forward second clamping diode Dca2 form the current path, such that the current may flow from the AC output terminal Na to the neutral point terminal Nn via the turned-on fifth transistor Q5a and the forward second clamping diode Dca2.

Figures 5A, 5B:
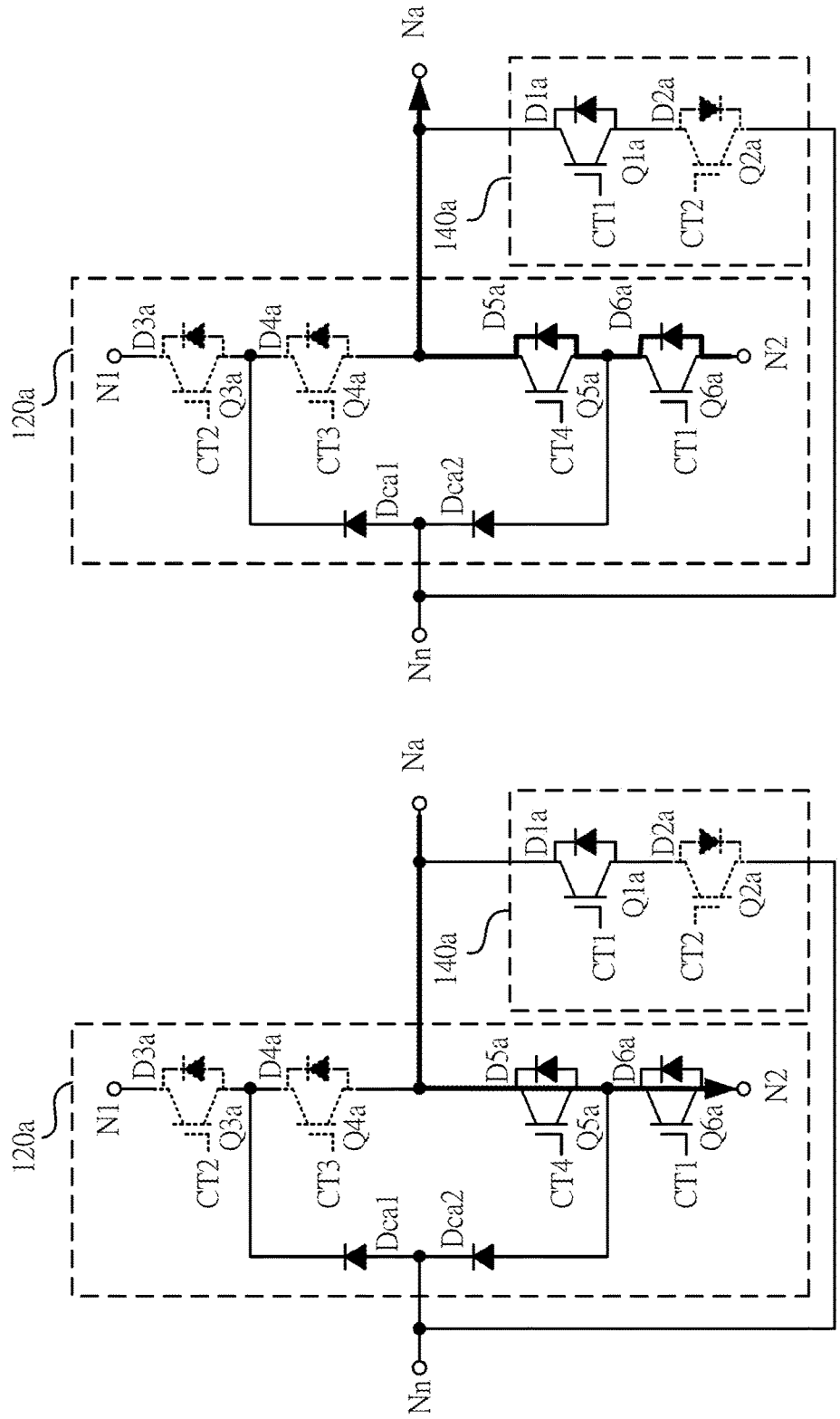

Next, as depicted in FIG. 5A and FIG. 5B, in the lower half cycle in which the AC output voltage Va is negative, the second transistor Q2a and the third transistor Q3a are OFF, the first transistor Q1a and the sixth transistor Q6a are ON. When the bridge leg 120a stores energy in the inductance unit La, the third control signal CT3 is at the disable level (e.g., a low level) to turn off the fourth transistor Q4a. The compensated fourth control signal CT4 is at the enable level (e.g., a high level) to turn on the fifth transistor Q5a, such that a path is formed between the AC output terminal Na and the second DC terminal N2.

As depicted in FIG. 5A, when the voltage and the current are in the same direction, the turned-on third transistor Q5a and the fourth transistor Q6a form the current path such that the current may flow from the AC output terminal Na to the first DC terminal N2. On the other hand, as depicted in FIG. 5B, when the voltage and the current are in the opposite direction, the fifth diode D5a inversely coupled in parallel to the fifth transistor Q5a, and the sixth diode D6a inversely coupled in parallel to the sixth transistor Q6a form the current path, such that the current may flow from the second DC terminal N2 to the AC output terminal Na via the forward fifth diode D5a and the sixth diode D6a.

Figure 6B:
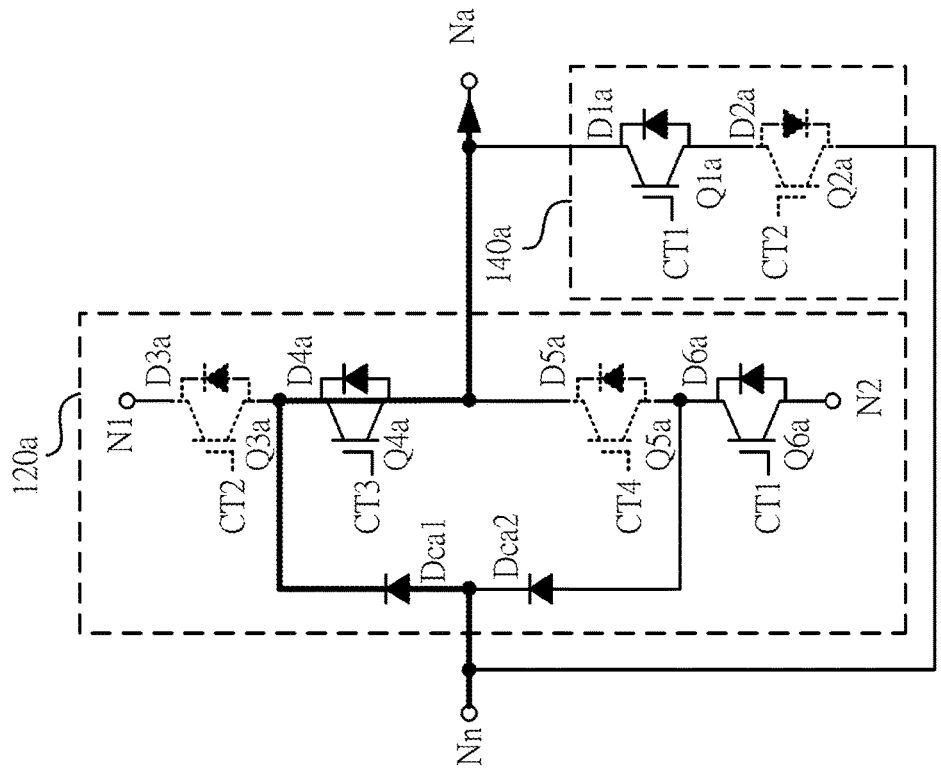
Figure 6A:
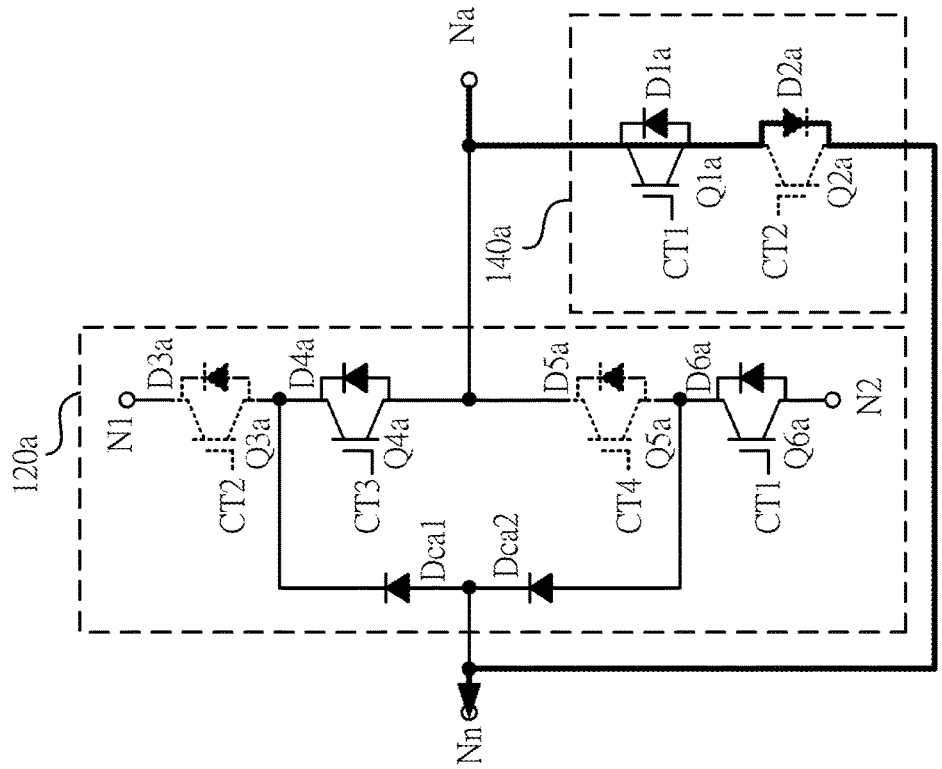

Next, as depicted in FIG. 6A and FIG. 6B, when the inductance unit La releases energy, the third control signal CT3 is at the enable level to turn on the fourth transistor Q4a, and the compensated fourth control signal CT4 is at the disable level to turn off the fifth transistor Q5a, such that a path is formed between the AC output terminal Na and the neutral point terminal Nn.

As depicted in FIG. 6A, when the voltage and the current are in the same direction, the turned-on second transistor Q1a and the second diode D2a inversely coupled in parallel to the second transistor Q2a form a current path, such that the current may flow from the AC output terminal Na to the neutral point terminal Nn via the forward second diode D2a. On the other hand, as shown in FIG. 6B, when the voltage and the current are in the opposite direction, the turned-on fourth transistor Q4a and the forward first clamping diode Dca1 form the current path, such that the current may flow from the neutral point terminal Nn to the AC output terminal Na via the turned-on fourth transistor Q4a and the forward first clamping diode Dca1.

Although the FIG. 3A, FIG. 3B~FIG. 6A, FIG. 6B are illustrated to explain the operation of the transistor switches in bridge leg 120a and the corresponding switching circuit 140a, the operation of the transistor switches in bridge legs 120b, 120c and the corresponding switching circuits 140b, 140c are similar and thus are omitted herein for the sake of brevity.

Therefore, by the switching of the transistor switches mentioned above, when implementing the NPC multi-level inverter structure, the current path may be provided by the corresponding switching circuits 140a, 140b, 140c, such that the power inverter 100 may provide bi-directional current path in each operating periods. Thus, the third control signal CT3 and the fourth control signal CT4 may maintain at high switching frequency in the complete cycle, and achieve reactive power compensation without switching between high switching frequency and low switching frequency between upper half cycle and lower half cycle.

In some embodiments, since the first control signal CT1 and the second control signal CT2 received by the first transistors Q1a~Q1c, the second transistors Q2a~Q2c. the third transistors Q3a~Q3c and the sixth transistors Q6a~Q6c are low frequency signal in a complete cycle, semiconductor devices with lower conduction loss may be chosen to implement the switches. On the other hand, since the third control signal CT3 and the fourth control signal CT4 received by the fourth transistors Q4a~Q4c and the fifth transistor Q5a~Q5c are high frequency signal in a complete cycle, semiconductor devices with lower switching loss may be chosen to implement the switches. Alternatively stated, the transistors in the bridge legs 120a, 120b, 120c and in the switching circuit 140a, 140b, 140c may choose proper semiconductor devices respectively to reduce the overall loss and improve the conversion efficiency of the power inverter 100.

Reference is made to FIG. 7. FIG. 7 is a diagram illustrating a power inverting method 700 according to some embodiments of the present disclosure. For the convenience and clarity of the explanation, the following power inverting method 700 is discussed in accompanied with the embodiments shown in FIG. 1~FIG. 6A and FIG. 6B, but is not limited thereto. It will be apparent to those skilled in the art that various modifications and variations can be made of the present disclosure without departing from the scope or spirit of the disclosure. As shown in FIG. 7, the power inverting method includes steps S710, S720 and S730.

In the step S710, a plurality of ac output terminals Na~Nc in the power inverter 100 is conducted selectively to one of the first dc terminal N1, the second dc terminal N2, and the neutral point terminal Nn of the power inverter 100 by a plurality of bridge legs 120a~120c in the power inverter 100, in order to provide multiple-phase ac output voltage Va~Vc.

Specifically, in some embodiments, the operation of selectively conducting the ac output terminals Na~Nc to one of the first dc terminal N1, the second dc terminal N2, and the neutral point terminal Nn includes: selectively turning on or off the third transistor Q3a electrically coupled to the first dc terminal N1 in the corresponding bridge leg (e.g., the bridge leg 120a) according to the second control signal CT2; selectively turning on or off the fourth transistor Q4a electrically coupled between the third transistor Q3a and the ac output terminal Na in the corresponding bridge leg 120a according to the third control signal CT3; selectively turning on or off the fifth transistor Q5a electrically coupled to the output ac terminal Na in the corresponding bridge leg 120a according to the fourth control signal CT4 complementary to the third control signal CT3; and selectively turning on or off the sixth transistor Q6a electrically coupled between the fifth transistor Q5a and the second dc terminal N2 in the corresponding bridge leg 120a according to the first control signal CT1.

In some embodiments, the switching frequency of the third control signal CT3 and the fourth control signal CT4 is higher than the switching frequency of the first control signal CT1 and the second control signal CT2.

In the step S720, the power inverter 100 selectively turns on or off the first transistor Q1a electrically coupled to the corresponding one (e.g., the ac output terminal Na) of the ac output terminals Na~Nc according to the first control signal CT1.

In the step S730, the power inverter 100 selectively turns on or off the second transistor Q2a electrically coupled between the first transistor Q1a and the neutral point terminal Nn according to the second control signal CT2 complementary to the first control signal CT1.

Specifically, in some embodiments, in the steps S720 and S730, the operation of turning on or off the first transistor Q1a and the second transistor Q2a includes: outputting the first control signal CT1 with a disable level (e.g., a low level) to turn off the first transistor Q1a and outputting the second control signal CT2 with a enable level (e.g., a high level) to turn on the second transistor Q2a when the corresponding output voltage Va is positive; and outputting the second control signal CT2 with the disable level to turn off the second transistor Q2a and outputting the first control signal CT1 with the enable level to turn on the first transistor Q1a when the corresponding output voltage Va is negative.

While disclosed methods are illustrated and described herein as a series of acts or events, it will be appreciated that the illustrated ordering of such acts or events are not to be interpreted in a limiting sense. For example, some acts may occur in different orders and/or concurrently with other acts or events apart from those illustrated and/or described herein. In addition, not all illustrated acts may be required to implement one or more aspects or embodiments of the description herein. Further, one or more of the acts depicted herein may be carried out in one or more separate acts and/or phases.

In summary, in various embodiments of the present disclosure, by arranging corresponding switching circuits 140a, 140b, 140c to provide the current path, the switching of the transistor switches in the power inverter 100 may be maintained at low frequency or high frequency in a complete cycle, and not required to shift the switching frequency between the upper half cycle and the lower half cycle. Accordingly, proper semiconductor devices may be chosen respectively for the transistor switches to reduce the overall loss.

Although the power inverter 100 shown in the drawing and the above embodiments is a three phase three-level inverter, the circuits shown in the drawings are merely one example of the present disclosure and not meant to limit the present disclosure. In addition, the power inverter and the power inverting method of the present disclosure may be applied in the stand-alone system or a grid-connected system. Those skilled in the art may arrange corresponding switching circuits in other multi-level inverter structure or neutral point clamping inverter structure, to provide two-way current path to achieve reactive power compensation.

What is claimed is:
1. A power inverter, comprising:
a plurality of bridge legs, electrically coupled to a first dc terminal, a neutral point terminal and a second dc terminal of the power inverter, and each of the bridge legs electrically coupled to one of a plurality of ac output terminals, wherein an ac output voltage and an output current are provided via the corresponding ac output terminal; and
a plurality of switching circuits, wherein each of the switching circuits is electrically coupled between one of the ac output terminals and the neutral point terminal, and comprises a first transistor, a second transistor, a first diode, and a second diode, in which the first transistor and the second transistor are coupled in series, the first diode and the second diode are respectively coupled to the first transistor and the second transistor in parallel, and the first diode and the second diode are coupled inversely,
wherein on the condition that one of the bridge legs conducts the neutral point terminal to the corresponding ac output terminal, the second transistor is turned on and a current path via the turned-on second transistor and the first diode is provided when the ac output voltage and the output current are in the same direction during the positive half cycle of the ac output voltage.

2. The power inverter of claim 1, wherein the first transistor and the second transistor in the same switching circuit are respectively configured to be turned on or off selectively according to a first control signal and a second control signal which are complementary of each other.

3. The power inverter of claim 2, wherein during the positive half cycle of the ac output voltage, the corresponding first control signal is at a disable level, and during the negative half cycle of the ac output voltage, the corresponding first control signal is at an enable level.

4. The power inverter of claim 1, wherein each of the bridge legs comprises a third transistor, a fourth transistor, a fifth transistor, and a sixth transistor electrically coupled between the first dc terminal and the second dc terminal in series by order, wherein the neutral point terminal is electrically coupled to the third transistor and the fourth transistor via a first clamping diode, and to the fifth transistor and the sixth transistor via a second clamping diode, and the ac output terminal is electrically coupled to the fourth transistor and the fifth transistor.

5. The power inverter of claim 4, wherein the corresponding first transistor and the sixth transistor are configured to be turned on or off selectively according to a first control signal, and the corresponding second transistor and the third transistor are configured to be turned on or off selectively according to a second control signal, wherein the first control signal and the second control signal are complementary of each other.

6. The power inverter of claim 5, wherein the fourth transistor is configured to be turned on or off selectively according to a third control signal, and the fifth transistor is configured to be turned on or off selectively according to a fourth control signal, wherein the third control signal and the fourth control signal are complementary of each other.

7. The power inverter of claim 6, wherein switching frequency of the third control signal and the fourth control signal is higher than switching frequency of the first control signal and the second control signal.

8. The power inverter of claim 5, wherein during the positive half cycle of the ac output voltage, the corresponding first control signal is at a disable level, and during the negative half cycle of the ac output voltage, the corresponding first control signal is at an enable level.

9. The power inverter of claim 4, wherein on the condition that the one of the bridge legs conducts the first dc terminal to the corresponding ac output terminal, the third transistor and the fourth transistor are turned on and a current path via the turned-on third and fourth transistors is provided when the ac output voltage and the output current are in the same direction.

10. The power inverter of claim 4, wherein on the condition that the one of the bridge legs conducts the first dc terminal to the corresponding ac output terminal, a current path via a third diode and a fourth diode is provided when the ac output voltage and the output current are in the opposite direction, wherein the third diode and the fourth diode are respectively coupled the third transistor and fourth transistor in parallel.

11. The power inverter of claim 4, wherein on the condition that the one of the bridge legs conducts the neutral point terminal to the corresponding ac output terminal, the fifth transistor is turned on and a current path via the turned-on fifth transistor and the second clamping diode is provided when the ac output voltage and the output current are in the opposite direction during the positive half cycle of the ac output voltage.

12. The power inverter of claim 4, on the condition that the one of the bridge legs conducts the second dc terminal to the corresponding ac output terminal, the fifth transistor and the sixth transistor are turned on and a current path via the turned-on fifth and sixth transistors is provided when the ac output voltage and the output current are in the same direction.

13. The power inverter of claim 4, wherein on the condition that the one of the bridge legs conducts the second dc terminal to the corresponding ac output terminal, a current path via a fifth diode and a sixth diode is provided when the ac output voltage and the output current are in the opposite direction, wherein the fifth diode and the sixth diode are respectively coupled the fifth transistor and sixth transistor in parallel.

14. The power inverter of claim 4, wherein on the condition that the one of the bridge legs conducts the neutral point terminal to the corresponding ac output terminal, the first transistor is turned on and a current path via the turned-on first transistor and the second diode is provided when the ac output voltage of the ac output voltage are in the same direction during the negative half cycle of the ac output voltage.

15. The power inverter of claim 4, wherein on the condition that the one of the bridge legs conducts the neutral point terminal to the corresponding ac output terminal, the fourth transistor is turned on and a current path via the turned-on fourth transistor and the first clamping diode is provided when the ac output voltage and the output voltage are in the opposite direction during the negative cycle of the ac output voltage.

16. A power inverting method, comprising the steps of:
conducting, by a plurality of bridge legs in a power inverter, a plurality of ac output terminals to one of a first dc terminal, a second dc terminal, and a neutral point terminal of the power inverter selectively, in order to provide multiple-phase ac output voltage and output current;
selectively turning on or off a first transistor and a second transistor according to a first control signal and a second control signal complementary to the first control signal, respectively, wherein the first and second transistors are coupled in series, the first transistor is electrically coupled to a corresponding one of the ac output terminals and the second transistor is electrically coupled the neutral point terminal, wherein a first diode and a second diode are respectively coupled to the first transistor and the second transistor in parallel, and the first diode and the second diode are coupled inversely; and on the condition that one of the bridge legs conducts the neutral point terminal to the corresponding one of the ac output terminals, turning on the second transistor and providing a current path via the turned-on second transistor and the first diode when the ac output voltage and the output current are in the same direction during the positive half cycle of the ac output voltage.

17. The power inverting method of claim 16, further comprising the steps of:

selectively turning on or off a third transistor electrically coupled to the first dc terminal in the corresponding bridge leg according to the second control signal;

selectively turning on or off a fourth transistor electrically coupled between the third transistor and the corresponding one of the ac output terminal in the corresponding bridge leg according to a third control signal;

selectively turning on or off a fifth transistor electrically coupled to the output the corresponding one of the ac terminal in the corresponding bridge leg according to a fourth control signal complementary to the third control signal; and selectively turning on or off a sixth transistor electrically coupled between the fifth transistor and the second dc terminal in the corresponding bridge leg according to the first control signal.

18. The power inverting method of claim 17, wherein switching frequency of the third control signal and the fourth control signal is higher than switching frequency of the first control signal and the second control signal.

19. The power inverting method of claim 16, further comprising the steps of:

outputting the first control signal with a disable level to turn off the first transistor and outputting the second control signal with an enable level to turn on the second transistor during the positive half cycle of the corresponding output voltage; and outputting the second control signal with the disable level to turn off the second transistor and outputting the first control signal with the enable level to turn on the first transistor during the negative half cycle of the corresponding output voltage.

20. The power inverting method of claim 16, further comprising the steps of:

on the condition that the one of the bridge legs conducts the neutral point terminal to the corresponding one of the ac output terminals, turning on the first transistor and providing a current path via the turned-on first transistor and the second diode when the ac output voltage and the output current are in the same direction during the negative half cycle of the ac output voltage.

* * * * *